United States Patent [19]

Farrell

[11] Patent Number: 5,282,061
[45] Date of Patent: Jan. 25, 1994

[54] PROGRAMMABLE APPARATUS FOR DETERMINING DOCUMENT BACKGROUND LEVEL

[75] Inventor: Barbara L. Farrell, Fairport, N.Y.

[73] Assignee: Xerox Corporation, Stamford, Conn.

[21] Appl. No.: 811,853

[22] Filed: Dec. 23, 1991

[51] Int. Cl.⁵ ............................................. H04N 1/40
[52] U.S. Cl. ..................................... 358/464; 358/448
[58] Field of Search ............... 358/479, 22, 462, 463, 358/464, 467, 448; 382/50, 53, 54

[56] References Cited

U.S. PATENT DOCUMENTS

| | | | |
|---|---|---|---|
| 4,339,745 | 7/1982 | Barber et al. | 382/8 |
| 4,809,349 | 2/1989 | Herby et al. | 382/50 |
| 4,811,115 | 3/1989 | Lin et al. | 358/283 |
| 4,827,253 | 5/1989 | Maltz | 358/22 |
| 4,885,784 | 12/1989 | Miyagawa et al. | 382/8 |
| 4,931,881 | 6/1990 | Matsui et al. | 358/466 |
| 4,970,605 | 11/1990 | Fogaroli et al. | 358/461 |

*Primary Examiner*—Edward L. Coles, Sr.
*Assistant Examiner*—Jerome Grant, II
*Attorney, Agent, or Firm*—Duane C. Basch

[57] ABSTRACT

An apparatus for efficiently determining the background level of an image, based upon a sampling of the image, during processing of the image signals and without the need for a prior scan operation. The apparatus includes programmable sampling counters, to indicate when image signals for background determination are present on the video path, and an image signal verification device for excluding signals which are not representative of background regions of the image. The background determination apparatus also includes arithmetic circuitry for calculating a background level based upon the sampled image signals and for determining additional threshold levels based upon the background level.

29 Claims, 8 Drawing Sheets

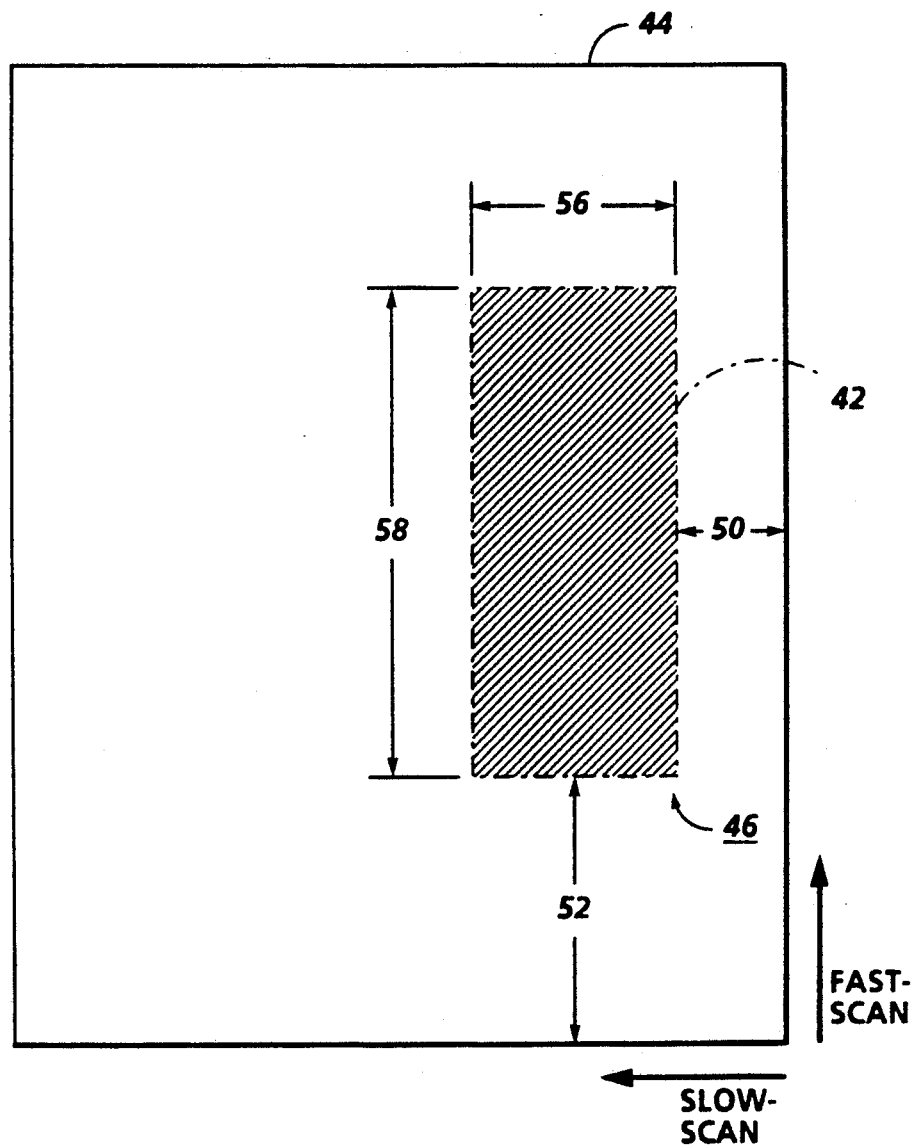

PROGRAMMABLE APPARATUS FOR DETERMINING DOCUMENT BACKGROUND LEVEL

BACKGROUND AND SUMMARY OF THE INVENTION

This invention relates generally to a digital signal processing apparatus, and more particularly to the determination of the background level of a document in a single-pass scanning system.

The features of the present invention may be used in the printing arts and, more particularly, in digital image processing and electrophotographic printing. In digital image processing there is a distinct advantage to being able to determine or detect the background level of a document coincident with the actual scanning of the document. With regard to efficiency, it is advantageous to provide such a feature without having to execute a prescan operation, thereby increasing the throughput of the scanning or digitizing system. Accordingly, the present invention provides a document background detection apparatus that operates during an initial portion of the scanning process to provide a real-time indication of the background level of the document being scanned.

While knowledge of the background level of a scanned document may be useful for numerous image processing operations that could be performed on the video signals generated during scanning, the most apparent use would be for background compensation. Once the background level of the document has been determined, an automated process may be employed to adjust the gain or offset levels of the digitized signals to compensate for a high background level, for example a document produced on a colored sheet of paper.

Another possible use for the background level information is in the determination of the image content in various regions of the document. For instance, a document analysis or image segmentation system might employ the background level information to more reliably detect, from the image signals, the types of images contained on the original document (e.g. text, line art, halftone, and continuous tone). An example of a halftone detection system is found in the patent U.S. Pat. No. 4,811,115, issued to Lin et al. on Mar. 7, 1989 for an "Image Processing Apparatus Using Approximate Auto Correlation Function to Detect the Frequency of Half-tone Image Data", the relevant portions of which are hereby incorporated by reference. Also, a U.S. patent application for "Improved Automatic Image Segmentation", by Shiau et al., Ser. No. 07/722,568 (filed Jun. 27, 1991), hereby incorporated by reference for its teachings, discloses an automatic image segmentation system suitable for classification of various regions of an image having different types of images present therein. Moreover, well known electroreprographic systems like the Xerox ® Docutech Production Publisher, ® may employ image segmentation systems of these types that would benefit from the background level determination capability of the present invention. Other approaches have been devised for the determination of the background level of an image, of which the following disclosures may be relevant:

U.S. Pat. No. 4,970,605, Patentee: Fogaroli et al., Issued: Nov. 13, 1990.

U.S. Pat. No. 4,931,881, Patentee: Matsui et al., Issued: Jun. 5, 1990.

U.S. Pat. No. 4,885,784, Patentee: Miyagawa et al., Issued: Dec. 5, 1989.

U.S. Pat. No. 5,214,471, Patentee: Bares, Issued: May 5, 1993.

The relevant portions of the foregoing references may be briefly summarized as follows:

U.S. Pat. No. 4,970,605 to Fogaroli et al. discloses a digital image scanning device having an automatic background compensation circuit for automatically adjusting a threshold signal in dependence on a plurality of parameters including the background color of an image. An adjusting circuit defines the threshold signal depending on an average of the positive-peak signal and a negative-peak signal previously received from a scanning means.

U.S. Pat. No. 4,931,881 to Matsui et al. discloses an image binarization system having an adjustable binarizing threshold value. The threshold value is based on the average of pixel density values around the pixels to be binarized. The threshold value is corrected downward when the average density of the surrounding pixels is larger than a specific boundary value, and the threshold value is corrected upward when the average density value of the surrounding pixels is smaller than the boundary value.

U.S. Pat. No. 4,885,784 to Miyagawa et al. discloses a method and apparatus for encoding a video image of an object into a binary signal. The method includes analyzing a preliminary video signal in a predetermined window to extract density information, and setting a threshold for binary encoding of subsequent video data using the extracted density information from the preliminary video information.

U.S. Pat. No. 5,214,471 to Bares for a "Background Monitoring Device", the relevant portions of which are hereby incorporated by reference, discloses an apparatus in which background intensity of a copy sheet having visible indicia thereon is monitored. To determine the background level generated by toner powder deposition in non-imaged regions, the sheet is scanned and a signal generated corresponding to the scanned region. The signal corresponding to the scanned region is processed and a signal corresponding to the background intensity of the copy sheet is generated.

The present invention seeks to overcome limitations found in the related references and commercially available products by providing an apparatus for automatically determining the background level of an electronic document, generally consisting of a plurality of video image signals, during the actual scanning or processing of the document. Furthermore, the present invention endeavors to provide the background level determination in a highly accurate manner using a region on the document whose coordinates may be programmed by an external source, thereby increasing the flexibility of the apparatus.

In accordance with one aspect of the present invention, there is provided an image processing system suitable for processing a video image represented by a plurality of video signals. The signals have a predetermined domain of greyscale values and represent both the content and the background regions of the image. The image processing system further includes an apparatus for determining the greyscale level of the background regions. The background determining apparatus includes a windowing circuit for sampling a predetermined portion of the pixel signals in the video image and a comparison circuit for eliminating pixel signals which are not determined to be representative of the background region. Subsequently, an arithmetic logic circuit is employed to calculate a background level based upon the remaining pixel signals.

In accordance with another aspect of the present invention, the background determining apparatus includes a programmable register for input of a default background level which is to be used by the background determining apparatus to output one or more background levels, prior to the completion of the sampling of a predetermined portion of the pixel signals.

In accordance with yet another aspect of the present invention, the background determining apparatus has the capability for computing one or more fractional background levels as a function of the background level, where the additional background levels may be used to generate ranges of video levels for pixel classification.

Pursuant to another aspect of the present invention, there is provided a method for determining the background level of a video image in an image processing apparatus suitable for processing the video image, represented by a plurality of pixel signals. However, only a selected portion of the pixel signals in the video image are sampled for background level determination. As the video image contains pixel signals representing both the content and the background regions of the image, the method next eliminates those sampled pixel signals which are not determined to be representative of the background region. Finally, the remaining pixel signals are used to calculate the background level for the video image.

BRIEF DESCRIPTION OF THE DRAWINGS

FIG. 2 is an illustrative example of the location of the sampling window used in the present invention;

The present invention will be described in connection with a preferred embodiment, however, it will be understood that there is no intent to limit the invention to that embodiment. On the contrary, the intent is to cover all alternatives, modifications, and equivalents as may be included within the spirit and scope of the invention as defined by the appended claims.

DESCRIPTION OF THE PREFERRED EMBODIMENT

The following description includes references to slow-scan and fast-scan digital image data, when discussing the orientation of the window coordinates and sampled signals used by the background determination circuitry. For purposes of clarification, data collected along a fast-scan direction is intended to refer to individual pixels located in succession along a raster of image information, while data collected in the slow-scan direction refers to data derived from a common raster position across multiple rasters or scanlines. As an example, slow-scan data would be used to describe signals captured from a plurality of elements along a linear photosensitive array as the array was moved relative to a document. On the other hand, fast-scan data would refer to the sequential signals collected along the length of the linear photosenstiive array during a single exposure period, and is also commonly referred to as a raster of data.

The following description also includes references to video image signals, or pixels, which may be either analog or digital voltage representations of the image, as provided from a suitable source. For example, the image data pixels may be obtained through line by line scanning of an image bearing original by one or more photosensitive element, such as a multiple photosite array of charge coupled devices, commonly referred to as CCD's. Line by line scanning of an image bearing original for the derivation of image data is well known and does not form a part of the present invention. Furthermore, for the purposes of the following description, it will be assumed that the video signals are digital signals that fall within a particular domain of values representing a greyscale, where the lower signal levels generally represent regions of an image having content, as opposed to background regions which will generally be reflected by higher signal levels.

Figure 1:
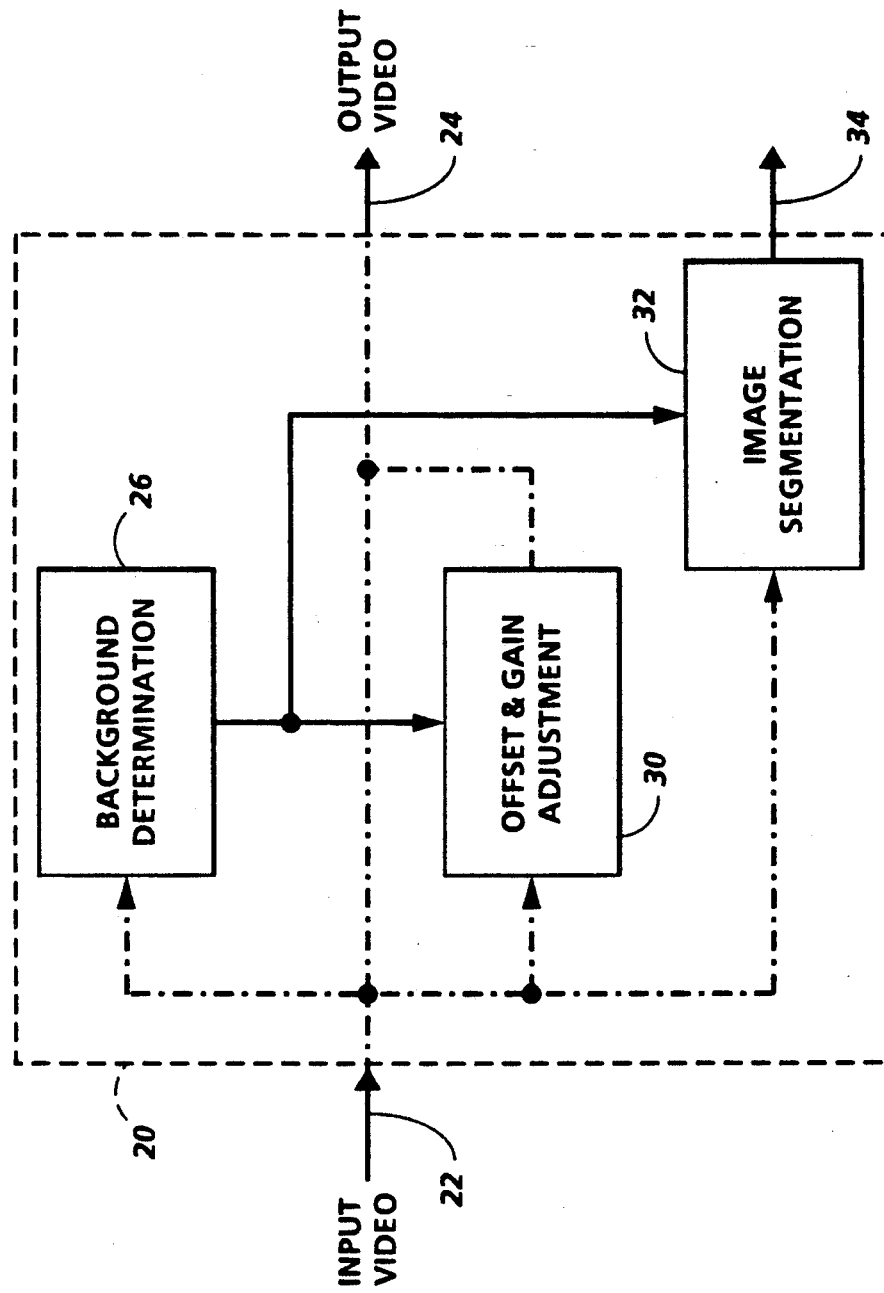
FIG. 1 is a general schematic illustration of an image processing hardware module incorporating the background determination apparatus of the present invention.

For a general understanding of an image processing hardware module incorporating the features of the present invention, reference is made to the drawings. In the drawings, like reference numerals have been used throughout to designate identical elements. FIG. 1 schematically depicts some of the possible components of a digital image processing hardware module, such as might be used in an electrophotographic system for the processing and analysis of a video signal prior to its output.

Referring now to FIG. 1, which illustrates an image processing hardware module incorporating the present invention, image processing module 20 generally receives video signals on line 22, and subsequently processes the video signals to produce an output signal which is transmitted along line 24. Numerous image processing operations may be carried out within image processing module 20, however, in the illustrated example, only two image processing operations are shown in conjunction with background determination module 26. The two image processing operation blocks, offset and gain adjustment block 30 and image segmentation block 32, may be used singularly, in parallel, or may be bypassed completely during processing of the input video.

Typical output from the offset and gain correction block, block 30, is a corrected video signal, possibly utilizing a larger range of the video domain, via gain correction, or a more centralized portion of the domain, via offset correction. In comparison, output from the image segmentation block, via line 34, is generally in the form of data which is indicative of the imaginal content of certain regions of the image, as defined by the input video signals. As an example, the data output by an image segmentation block designed to detect the presence of high frequency halftoned regions may be used to selectively enable subsequent image processing hardware which might apply a descreening filter (e.g., a low-pass filter) to all image signals indicative of a halftone region. An illustrative example of such an image segmentation block may be found in pending U.S. patent application Ser. No. 07/722,568 for "Improved Automatic Image Segmentation", by Shiau et al., which has been previously incorporated herein by reference.

In addition, the background level determined by the present invention may be further modified to calculate two relative background levels that would be used to classify regions of the image, as described in U.S. patent application Ser. No. 07/722,568 by Shiau et al. More specifically, the additional background levels are calculated by multiplying the determined background level by fractional values in order to produce the additional fractional background levels. Once determined, the image segmentation block would utilize these additional levels as thresholds, to identify image signals representing "white" or background pixels or image signals representing grey pixels within the original document. The two fractional background levels are termed, White1 and White2, and are shown as outputs in FIG. 5A. Moreover, the fractions used to calculate the White1 and White2 background levels may be programmed, with typical values of 90% for White1 and 82% for White2. These values are used to check or confirm image pixels having values near the background level. For example, image segmentation block 32 may make a preliminary classification of an image region, and might subsequently confirm the classification by identifying pixels within the region as "white" or background pixels if they have levels greater than White1, or as grey or halftone pixels if they have levels less than White2. Hence, the additional fractional background levels enable a more robust classification method to be used, rather than merely relying on the background level to determine pixels representing background.

Referring now to FIG. 2, which illustrates the location of a sample window used by the present invention, rectangular window 42 defines a region within image 44 where pixel signals may be analyzed to determine the background level of the image. The boundaries are defined within the image by the starting location of the window and the length and width of the window. For example, window 42 might have a starting position at position (512, 128), indicated in FIG. 2 by reference numeral 46. The starting position will have slow-scan offset of 128 scanlines, distance 50, and a fast-scan offset of 512 pixels, distance 52. The location of the diagonally opposite corner of window 42 is defined by the slow-scan width of the window, and fast-scan length of the window, distances 56 and 58, respectively, both of which are referenced from starting position 46. In normal operation, the location of background determination window 42 is defined by programming a set of four registers within background detection block 26. Subsequently, during processing of the input video, a set of four counters are used to determine when individual image signals lie within the boundary of the background determination window.

While the size and location of the background determination window is considered to be fully programmable, the present invention has limited the range of possible values, as well as the resolution of the counters, in order to further minimize the cost and number of components necessary to implement the window control or sampling operation. Also, a tradeoff must be made between the size of the sampling window and the accuracy of the background determination value. In other words, image signals generated from documents having a colored background, which are processed using a large background determination window, may show undesirable output or misclassification of image regions, as a result of the delay in determination of an accurate background level, caused by the large window. Moreover, a larger window may result in an overlap of the background sampling region with a non-background region of the image, possibly resulting in a less accurate background level.

Figure 3A:
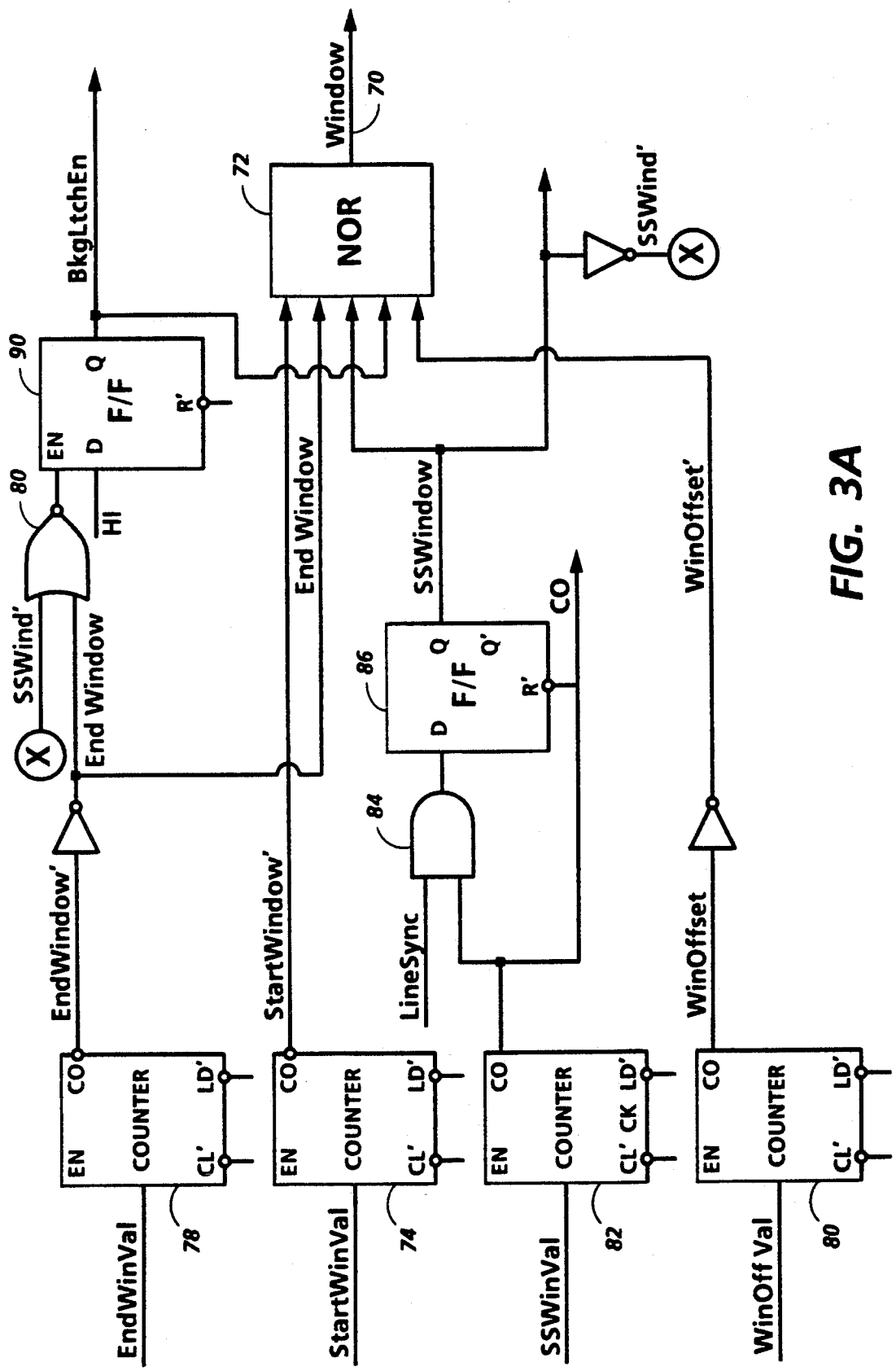
FIG. 3A is a hardware block diagram illustrating the hardware components used in the present invention for detecting image signals falling within the sampling window of FIG. 2.
Figure 3B:
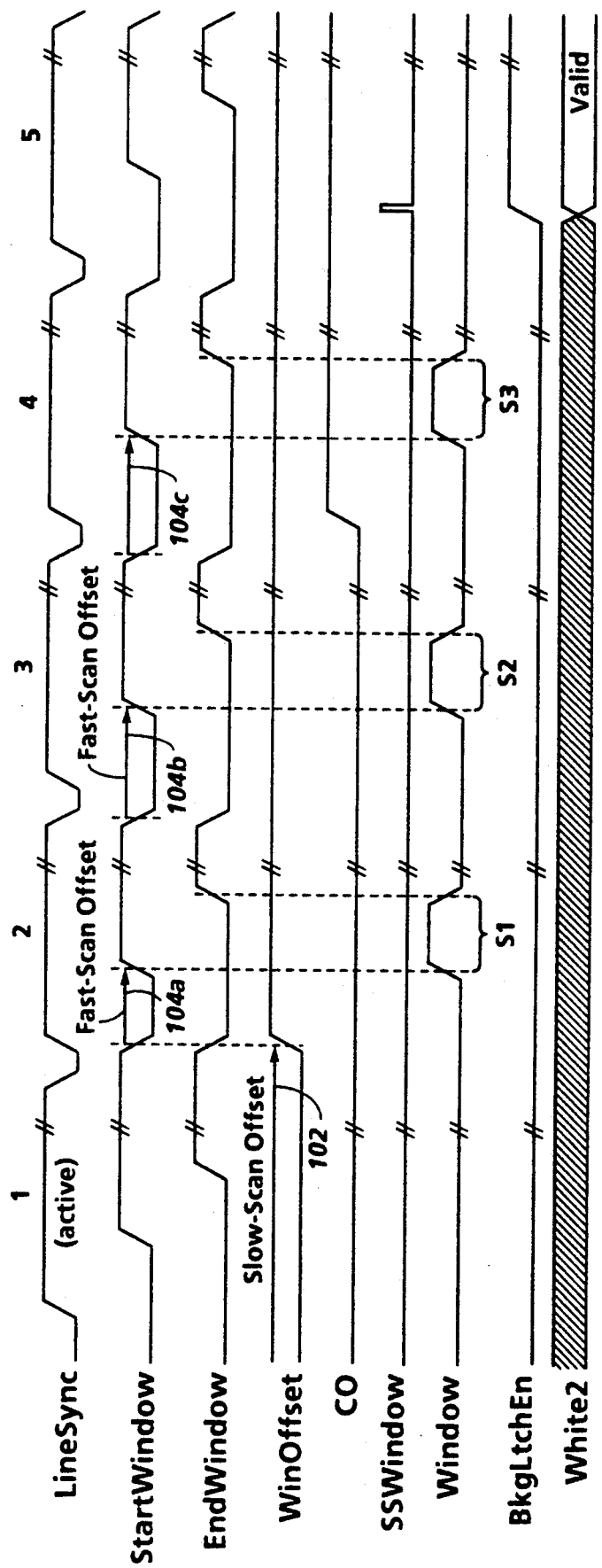
FIG. 3B is a representation of a typical timing diagram illustrating the relationships between the signals shown in FIG. 3A.

Referring next to FIGS. 3A and 3B, which detail the digital logic used to make the decision on presence within the background determination window, Window signal 70 is active high, whenever the image signal passing through the background determination block falls within the boundaries of the window. As illustrated, signal 70 is the product of a NOR operation, block 72, combining five separate signals. The first signal, StartWindow', is produced by counter 74, and is output whenever counter 74 reaches a predetermined slow-scan start position value, StartWindVal. As implemented, counter 74 is incremented by a mod-16 pixel clock which produces a single pulse for every sixteen video image signals processed through image processing module 20. Because the counter is clocked by a clock that is essentially one-sixteenth the resolution of the pixel clock, PixClk, the resolution of the counter is also reduced, resulting in the need to adjust the value of StartWindVal by dividing by sixteen. For instance, window start position 46 of FIG. 2 was described as being 512 pixels from the start of the scanline. If this were the case, the StartWindVal would be one-sixteenth of that distance, or thirty-two. Upon reaching the StartWindVal value, counter 74 outputs an active-low signal on the carry-out output, StartWindow' line, and disables further counting until reaching the end of a scanline of image signals. At that point, the counter will be reset and reloaded to once again begin counting to determine the offset of the starting position for the window.

In a manner similar to that described for counter 74, counter 78 is used to track the end of the background determination window, in the fast-scan direction. Counter 78 outputs an active-low carry-out signal, EndWindow', whenever it has reached the EndWindVal value. The actual value of EndWindVal is one-sixteenth the value of the window length, as illustrated by distance 58 of FIG. 2, for the same reasons previously described with respect to counter 74. More importantly, counter 78 is disabled, meaning that it is not incremented, until carry-out of counter 74 is active. In other words, counter 78 begins counting after counter 74 has stopped counting, thereby establishing the length of the window with reference to the fast-scan start position. The output of counter 78, EndWindow', is used in an inverted fashion as an input to NOR block 72 and to OR-gate 80.

While counters 74 and 78 act in concert to define the fast-scan boundaries of the background determination window, counters 80 and 82 similarly control the generation of signals which are used to determine the boundaries of the window along the slow-scan direction. Counter 80 is preprogrammed with a value, WinOffVal, representative of the slow-scan offset distance, distance 50 of FIG. 2, before processing begins. After initiating the processing of the image signals, counter 80 is incremented each time a scanline of image signals has been processed. When the preprogrammed number of scanlines have been processed, the WinOffset output value will transition to an active-high state to indicate that the beginning of the window has been reached along the slow-scan direction. As in the fast-scan window counters, the output of counter 80, WinOffset, will be used to enable the subsequent operation of slow-scan width counter 82.

Counter 82, the counter which tracks the end of the background determination window in the slow-scan direction, increments once per scanline until a value equal to the slow-scan length of the window, SSWinVal, has been reached. At that time, counter 82 will output an active-high signal on the carry-out line, CO. The signal on the CO line is subsequently passed to AND-gate 84 along with the LineSync' signal, an active-high signal that indicates when a raster of image signals is being processed. More importantly, the output of AND-gate 84 is passed to flip-flop 86 to produce output SSWindow, which is a pulsed signal used by the windowing hardware of FIG. 3A and averaging hardware of FIG. 4, to signal when the background level has been determined, and is valid. An active-low output from flip-flop 86, SSWind', is used as the second input to OR-gate 80, the output of which controls the enable line of flip-flop 90, thereby causing the output of flip-flop 90, BkgLtchEn, to transition to an active level at the beginning of the first scanline following the end of the background determination window.

As the signals represented in FIG. 3B illustrate, sampling regions, S1, S2, S3 are identified by the Window signal which is output from NOR-gate 72. Also, the timing diagram clearly indicates the slow-scan offset, generally indicated by reference arrow 102, and the fast-scan offsets for each scanline, arrows 104a, 104b and 104c. Hence, the timing diagram indicates the signals which might be observed within the sampling or window control logic when operating the background determination hardware over a sampling window which is offset one scanline from the beginning of the image and is three scanlines long. Furthermore, while size constraints make it impossible to show signals to a pixel resolution, it is clear that the sampling window is offset from the beginning of each scanline, offset 104a, 104b and 104c, and samples a portion of the remainder of each scanline, S1, S2 and S3, respectively.

Figure 4:
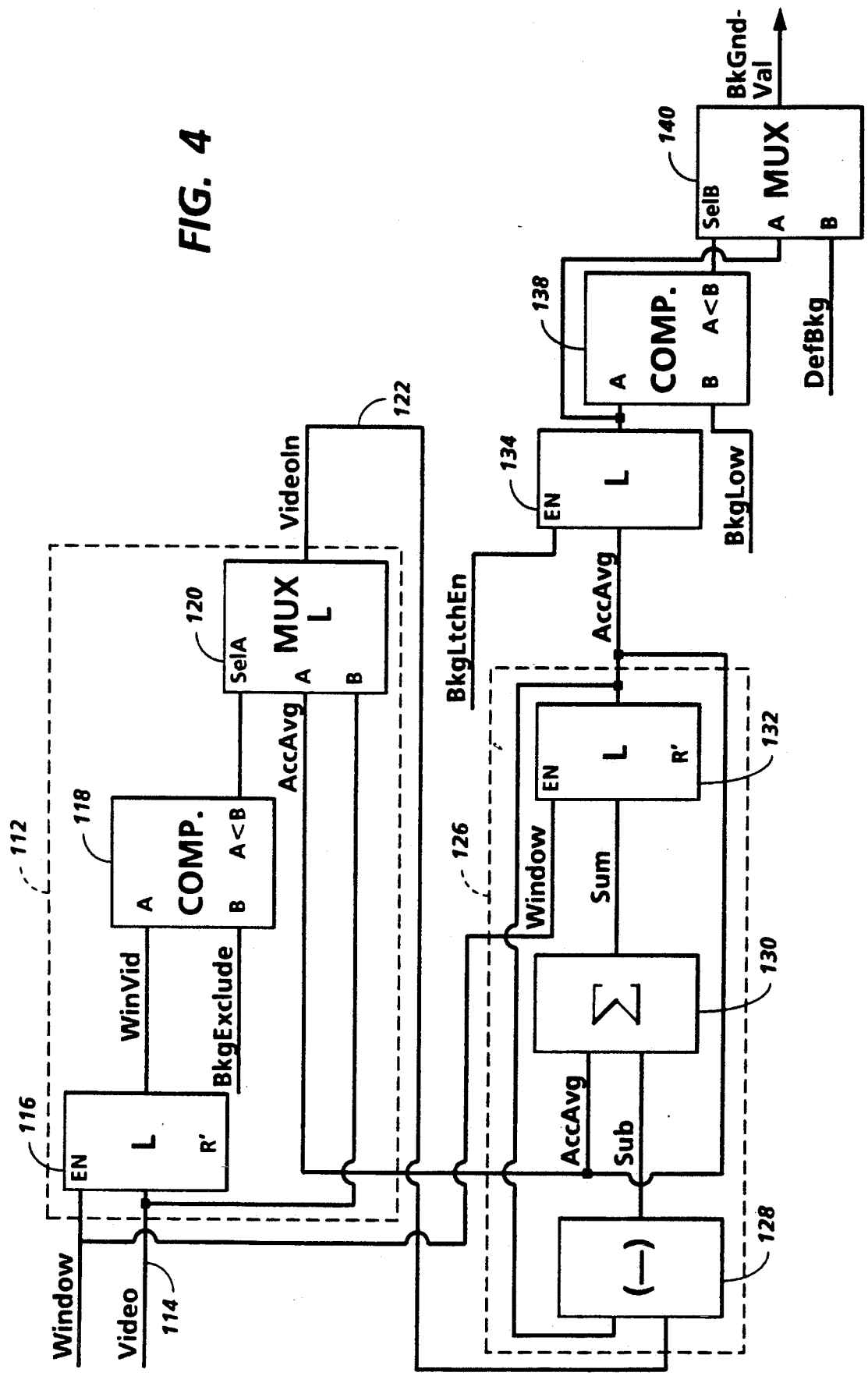
FIG. 4 is a hardware block diagram showing the components used in qualifying sampled signals prior to determination of the background level, in addition to the background determination hardware.

Referring now to FIG. 4, which illustrates the logic blocks used to verify the video image signals and calculate the running average of the signals, line 114 supplies the signals to the circuitry, where they are temporarily stored at latch 116. As latch 116 is enabled by the Window signal, no data is latched unless the Window signal of FIGS. 3A and 3B is active, thereby causing the hardware to operate only on the image signals contained within the window boundaries. Assuming that the image signal lies within the background determination window, the latched value, WinVid, is compared against a threshold value, BkgExclude, at comparator 118. If the value of WinVid is below the value of BkgExclude, then the signal is determined to be indicative of a marked region of the image, or in other words, a non-background signal which should be excluded from the running average of the background region. The output of comparator 118 determines whether the Video signal will be used for subsequent calculation by controlling the select line of MUX 120. MUX 120 selects the incoming video signal, Video, or the accumulated running average, AccAvg, and outputs the value, VideoIn, on line 122.

Subsequently, arithmetic processing circuitry 126 processes the signal on line 122 in accordance with equation (a):

$$AccAvg = X(AccAvg) + (1-X)VideoIn, \quad (a)$$

where;
AccAvg is the running average for the background level,
VideoIn is the value of the incoming video signal, and
X is a constant indicative of the relative weighting between the running average and the incoming video signal.

In the present implementation, X is assumed to be seven-eighths ($\frac{7}{8}$), resulting, not only in a minimization of the contribution of each video signal to the running average, but, also making the hardware implementation less complex and less expensive. It should be understood, however, that alternative weightings for the running average and incoming video signals have been contemplated and may be employed by the present invention. Substituting seven-eighths for the value of X in equation (a), and simplifying the equation results in equation (b).

$$AccAvg = AccAvg + \tfrac{1}{8}(VideoIn - AccAug). \quad (b)$$

As implemented in arithmetic circuit 126 using signed two's complement arithmetic, subtractor/divider 128 subtracts the AccAvg value from the VideoIn value and subsequently divides the result by eight by dropping the three least significant bits of the result. Once again, to simplify the hardware implementation, subtractor/divider 128 is actually an adder that operates on signed two's compliment values, where the running average, AccAvg, is an eight-bit number having a sign-bit (ninth-bit) which is set, and VideoIn is an eight-bit number having a zeroed sign-bit. Next, the six-bit (five significant bits plus sign-bit) result from subtractor/divider 128, Sub, is passed to summation block 130 where it is added to the AccAvg operand. The resultant summation signal, Sum, is output from summation block 130 and is stored in latch 132, making it available for subsequent use in calculating the running average as previously described. As shown, latch 132 is enabled by the Window signal, thereby continuously latching the resultant running average, Sum, while the video signals are within the sample window. The logic components of verification circuit 112 and arithmetic circuit 126 are generally operative only when the Window signal is active, thereby limiting the image signal samples processed to those occurring within the boundaries of background determination window 42 of FIG. 2. After completing the sampling and calculation of the background level, the AccAvg value is advanced and stored in latch 134.

Subsequent to determining the final running average and storing it at latch 134, the value of AccAvg is compared against a lower threshold value at comparator 138. This test is implemented to assure that the value calculated is within a reasonable range of values, and to prevent deleterious effects that might be caused by a very low background level. Hence, the output of comparator 138 is used to select between the actual running average, AccAvg, or a default background level, DefBkg, at MUX 140. The output from MUX 140 being the background level which will be passed to the remaining digital logic circuitry for determination of the various background percentages, as illustrated in FIGS. 5A and 5B.

Figure 5A:
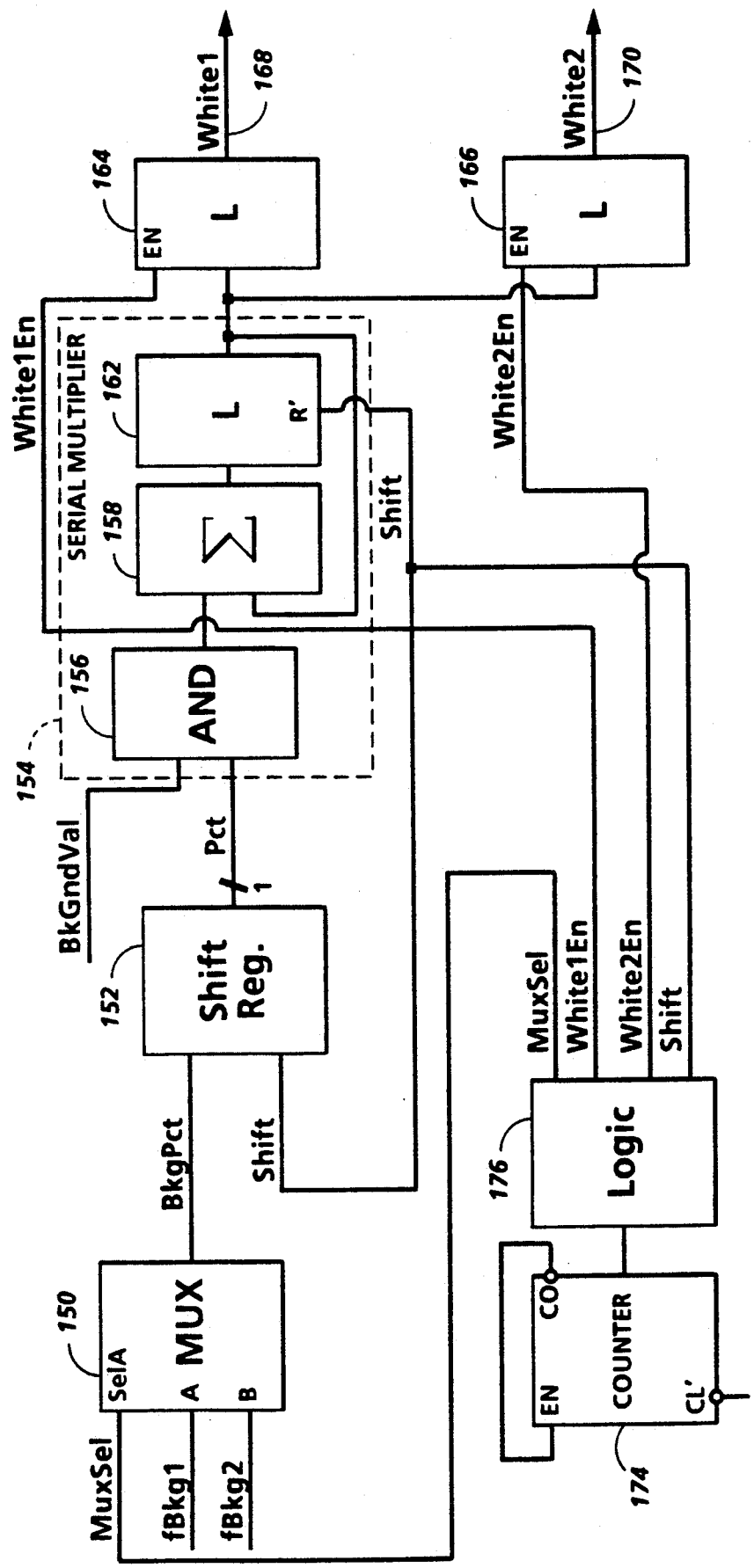
FIG. 5A is another hardware block diagram illustrating the components used for calculation of two relative background values which are used by the image segmentation device of FIG. 1.
Figure 5B:
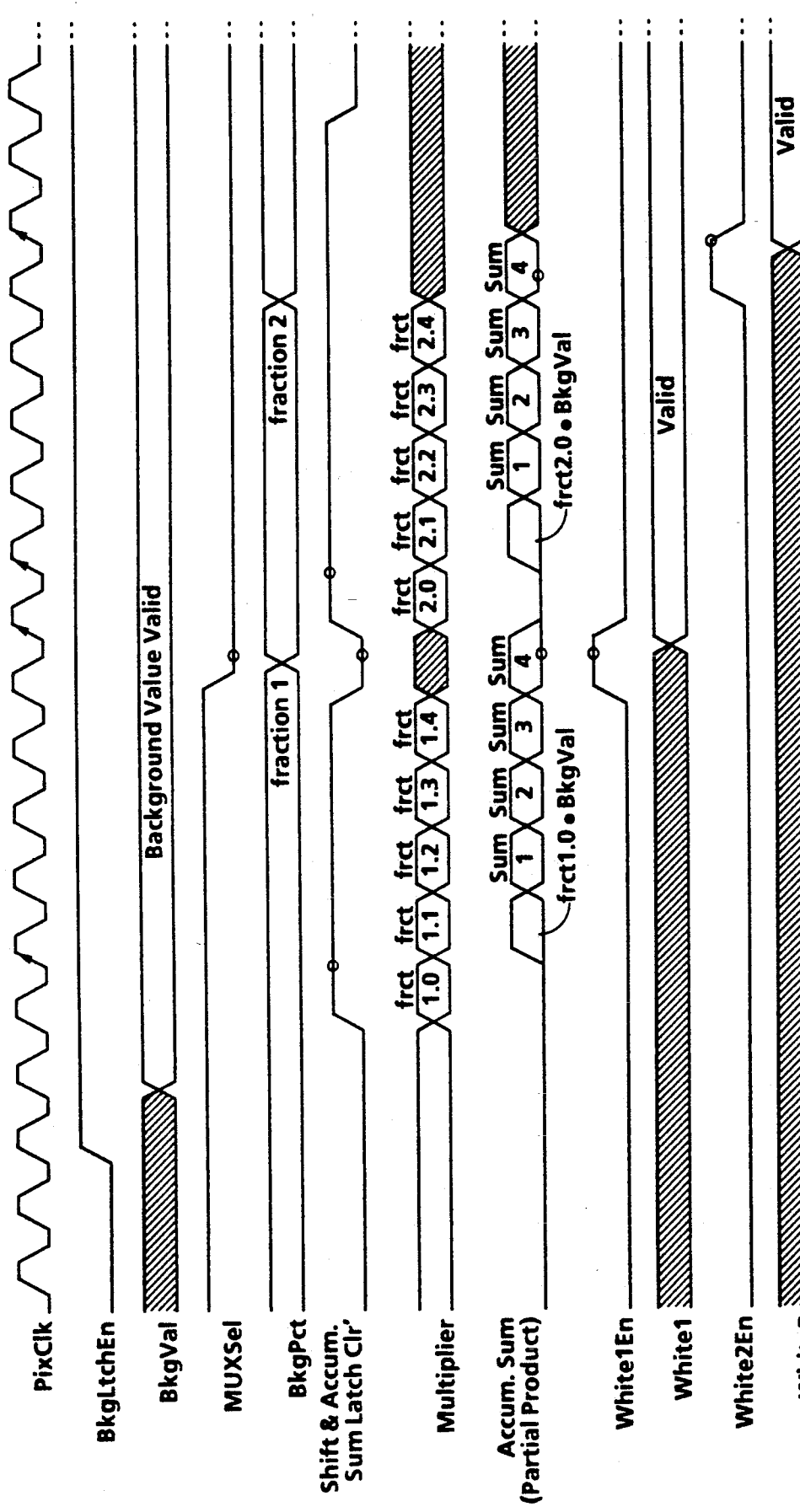
FIG. 5B is a representation of a typical timing diagram illustrating the relationship between the signals shown in FIG. 5A.

Referring now to FIGS. 5A and 5B, which illustrate the digital logic operations that are used to determine the two additional background levels, White1 and White2, the BkGndVal signal output from MUX 140 of FIG. 4 is subsequently used to determine the additional background values that are output on lines 168 and 170. To produce the two different background levels, the BkGndVal value is multiplied by two unique fractions, fBkg1 and fBkg2. Both of these values are stored in programmable registers (not shown), and are made available to the logic circuitry via MUX 150. The value to be used to produce the fractional representation of the background value, White1 or White2, is determined via the MuxSel line, which first enables the processing of fBkg1 and then fBkg2, as illustrated by the transition of MuxSel from a high to a low signal level in FIG. 5B. Once selected, the 5-bit fractional value, BkgPct, is output from MUX 150 to shift register 152, where the the parallel data is serialized into single bits, fract0—fract4, and passed sequentially to serial multiplier block 154.

Serial multiplier block 154, the operation of which is illustrated by the timing diagram of FIG. 5B, first receives the background level signal, BkGndVal, at AND block 156, where the it is ANDed with one of the sequential bits of the fractional value being output from shift register 152. The result of the AND operation is then passed to summation block 158 where it is added to a previous result which had been stored in latch 162. The following example will illustrate the steps of the serial multiply operation carried out by serial multiplier 154.

Assuming,
BkGndVal = 240, or (1111000b); and
BkgPct = 15/32, or (01111b); then
serial binary multiplication would be accomplished by the following five steps:

```
(1)         1 1 1 1 0 0 0 0
        AND             1
fraction0   1 1 1 1 0 0 0 0   ───>         1 1 1 1 0 0 0 0

(2)         1 1 1 1 0 0 0 0
        AND            1
fraction1   1 1 1 1 0 0 0 0   ───>       + 1 1 1 1 0 0 0 0
                                   Sum1    1 0 1 1 0 1 0 0 0 0

(3)         1 1 1 1 0 0 0 0
        AND           1
fraction2   1 1 1 1 0 0 0 0   ───>       + 1 1 1 1 0 0 0 0
                                   Sum2    1 1 0 1 0 0 1 0 0 0 0

(4)         1 1 1 1 0 0 0 0
        AND         1
fraction3   1 1 1 1 0 0 0 0   ───>       + 1 1 1 1 0 0 0 0
                                   Sum3    1 1 1 0 0 0 0 1 0 0 0 0

(5)         1 1 1 1 0 0 0 0
        AND         0
fraction4   0 0 0 0 0 0 0 0   ───>       + 0 0 0 0 0 0 0 0
                                   Sum4    1 1 1 0 0 0 0. 1 0 0 0 0.
```

Hence, at each step of the process, latch 162 shifts the stored result output by summation block 158 to the right by one bit position, to account for the binary fraction.

Both the MuxSel and Shift lines are controlled by digital logic block 176, generally implemented as a decoder which, in response to output from clock-cycle counter 174, controls the sequencing of the logic components used to produce the output values White1 and White2. In addition, logic block 176 also provides the latch enable signals, White1En and White2En output to latches 164 and 166, respectively, to signal those latches when latch 162 contains a valid fractional background value. As illustrated by the above example and the timing diagram of FIG. 5B, the five cycles of the serial multiplier are executed, as indicated by the Multiplier and Accum/Sum signals, before the latch enable signals are raised. While the present embodiment is limited to a 5-bit fraction, a larger fraction may be used, however, this would obviously require additional steps in the serial multiplication process. Subsequently, the White1 and White2 fractional background levels may be used by image segmentation block 32 of FIG. 1 for classification of individual image pixels as previously described.

Figure 6:
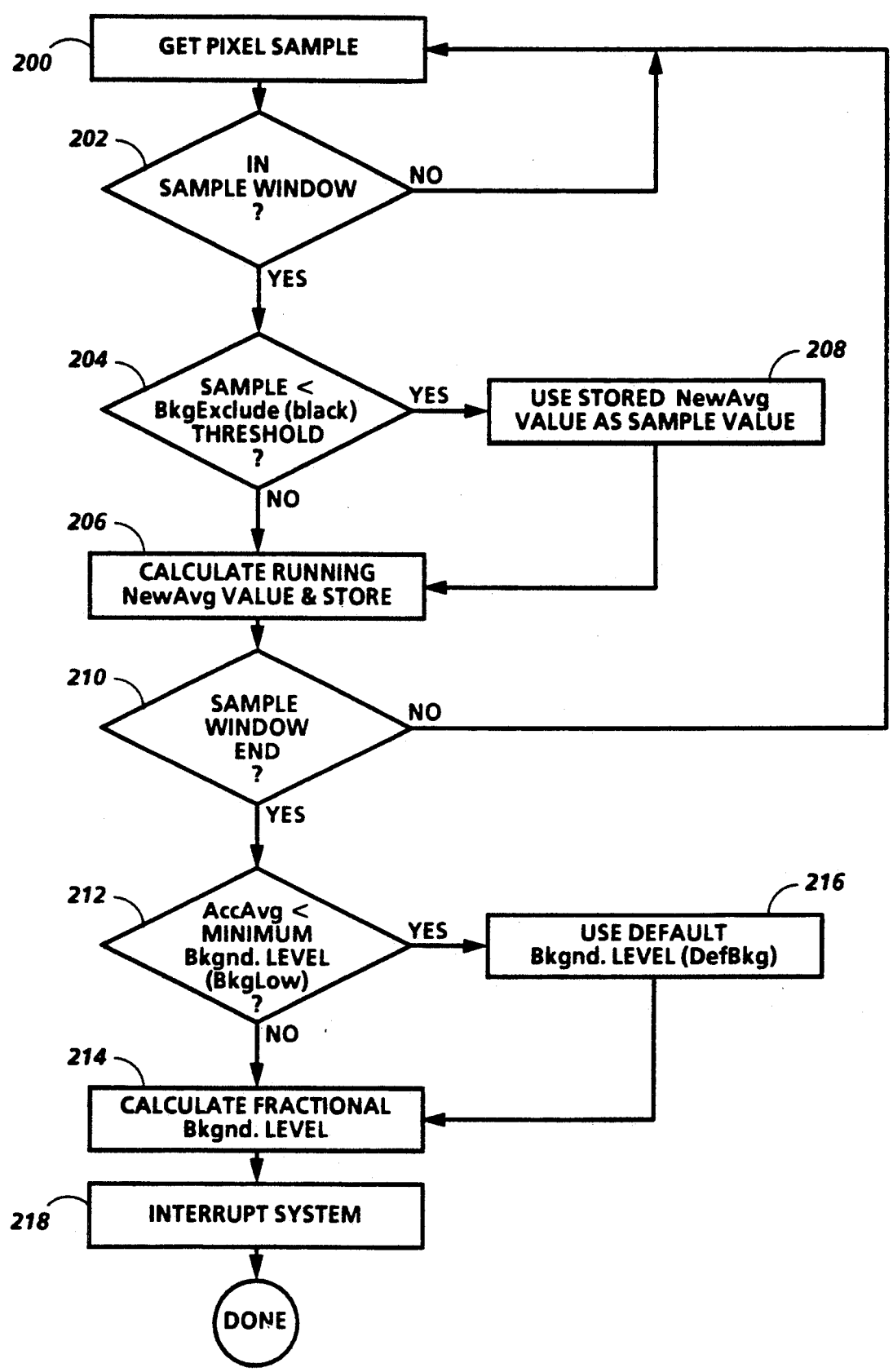
FIG. 6 is a flow diagram illustrating the equivalent steps associated with the operation of the background determination hardware of the present invention.

Having described the digital logic elements used to implement one embodiment of the background determination apparatus of the present invention, the operational steps of the apparatus will now be described with respect to the flowchart of FIG. 6. In a preferred embodiment, the background determination apparatus is used to detect and output the magnitude of the signals within the background regions of an image while the image is being generated by a scanning device. In order to provide a background level indication, or background signal, the background determination apparatus must use a "substitute" or default level until sufficient image context has been analyzed to determine an actual background level. Accordingly, the present invention allows for maximum flexibility in determining the default value, DefBkg, by providing a register that may be programmed with the desired value. Similarly, the sampling window data (StartWinVal, WinOffVal, EndWinVal, SSWinVal), the background fractions (fBkg1, fBkg2) and the thresholds (BkgExclude, BkgLow) may be programmed by writing a values to a registers in memory, using any suitable microprocessor or microcontroller. Once the default background level, the thresholds, the background fractions, and the window coordinates are programmed, the apparatus is ready to begin receiving image signals for determination of the background video level.

As previously stated, the background determination apparatus initially outputs the default background level, DefBkg, until the image signals lying within the sample window have been processed. The processing operation that occurs during the interim period before the actual background level is determined, is illustrated in FIG. 6. The recurring process begins at step 200, where the image signal is passed to the background determination apparatus, as represented by the video signal in FIG. 1. Once the pixel, or video signal is received, a determination is made at step 202, as to whether the sampled signal is from within the region defined by the sampling window. This step utilizes the Window signal, FIG. 4, to make that determination. If not, processing continues at step 200, where the system waits for the next sample. If, however, the sample was within the window, it is first compared against a black threshold level, BkgExclude, at step 204 to determine if it should be included in the running average. If the sample is greater than BkgExclude, then it is determined to be reflective of a possible background value and will be used in the calculation of the new running average at step 206. However, if the sample was less than BkgExclude, it would not be used, and the previous running average value would be substituted for the sampled signal value, step 208. In alternative embodiments, it may also be possible to simply exclude the sampled signal when it was below the BkgExclude level, or to substitute other alternate values, possibly even programmable constants such as BkgExclude.

As previously shown with respect to FIG. 4, the running average is calculated using the arithmetic processing circuitry, 126 of FIG. 4. Once the end of the sample window has been detected at step 210, and as indicated by the SSWindow signal pulse, processing would continue at step 212. Otherwise, the running average is calculated for the next pixel sample found within the sample window by continuing at step 200. At step 212, the running average of the background level, AccAvg, is compared against the minimum background level, BkgLow, to determine if the background level determined by the hardware is valid. If greater than the minimum background level, then the actual background level, AccAvg, is used to calculate the the fractional background levels at step 214. Otherwise, the default background level, step 216, is passed to serial multiplier 154 of FIG. 5A for calculation of the fractional background levels. Once the pair of fractional background levels has been determined, step 214, the background determination apparatus interrupts image segmentation device 32, step 218, to indicate that valid fractional background levels have been generated. Subsequently, the fractional background values in latches 164 and 166 (FIG. 5) would be passed to the image segmentation device. Moreover, the background level determined for the sample window is also made available for retrieval by the system. Finally, once the background level has been determined, the apparatus remains in an idle state until being reset by a signal indicating the end of the image has been reached.

In recapitulation, the present invention implements a background determination or detection process using digital logic components. The invention enables the determination of the background level of an image during image input, thereby enabling the immediate use of one or more background levels for analysis and processing of the image signals. Moreover, the present invention includes programmable features and validation logic to make the device flexible, while assuring that the apparatus produces a highly reliable background level result.

It is, therefore, apparent that there has been provided, in accordance with the present invention, a background level determination apparatus employing a novel method to determine the background level of an image coincident with the processing of the image data, thereby fully satisfying the aims and advantages hereinbefore set forth. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. In an image processing system suitable for processing an image represented by a plurality of video signals, said video signals representing both the content regions of the image and the background regions of the image, an apparatus for determining the background level of the image comprising:
   sampling means for sampling a selected portion of the video signals in the image;
   means, coupled to said sampling means, for identifying sampled video signals which are non-representative of the background regions of the image, said identifying means eliminating the non-representative video signals from the selected portion of the video signals; and
   means, coupled to said identifying means, for calculating a background level as a function of the level of the non-eliminated sampled video signals.

2. The image processing device of claim 1 wherein the sampling means includes:
   windowing means for identifying a sample region within the image; and
   control means, responsive to said windowing means, for indicating when a video signal received by the background determination apparatus is within the sample region.

3. The image processing device of claim 1 wherein said identifying means includes:
   memory means for receiving and storing a background threshold;
   means, in communication with said memory means, for comparing the level of the sampled video signal against the stored background threshold and providing a signal indicating when the sampled video signal is below the background threshold; and
   means, responsive to the signal produced by said comparing means, for eliminating the non-representative video signal.

4. In an image processing system suitable for processing an image represented by a plurality of video signals, said video signals representing both the content regions of the image and the background regions of the image, an apparatus for determining the background level of the image comprising:

sampling means for sampling a selected portion of the video signals in the image;

means, coupled to said sampling means, for identifying sampled video signals which are non-representative of the background regions of the image, including memory means for receiving and storing a background threshold, means, in communication with said memory means, for comparing the level of the sampled video signal against the stored background threshold and providing a signal indicating when the sampled video signal is below the background threshold, means, responsive to the signal produced by said comparing means, for eliminating the non-representative video signal, said eliminating means eliminating the non-representative video signals from the selected portion of the video signals;

means, coupled to said identifying means, for calculating a background level as a function of the level of the remaining sampled video signals; and means for substituting an alternate video signal for each non-representative signal eliminated.

5. The image processing device of claim 4 wherein the calculating means includes means for calculating a weighted running average of the levels of the non-eliminated video signals with the weighted running average being updated for each video signal received, and wherein the substituting means substitutes the weighted running average for the discarded signal.

6. In an image processing system suitable for processing an image represented by a plurality of video signals, said video signals representing both the content regions of the image and the background regions of the image, an apparatus for determining the background level of the image comprising:

sampling means for sampling a selected portion of the video signals in the image;

means, coupled to said sampling means, for identifying sampled video signals which are non-representative of the background regions of the image, said identifying means eliminating the non-representative video signals from the selected portion of the video signals;

means, coupled to said identifying means, for calculating a first background level as a function of the level of the non-eliminated sampled video signals; and means for computing a second background level for use by the image processing system, with the second background level being a fractional portion of the first background level.

7. The image processing device of claim 6 including means, responsive to the second background level, for delimiting at least two distinct ranges of signal levels to be used for classification of video signals having levels falling within the ranges.

8. The image processing device of claim 6 wherein said computing means comprises:

means for storing at least one binary fraction; and a serial multiplier suitable for determining the product of the stored binary fraction and the background level.

9. The image processing device of claim 6 wherein the computing means comprises:

first storing means for storing at least one digital fraction; and a serial multiplier, coupled to said first storing means, for sequentially multiplying the stored digital fraction by the first background level to produce the second background level.

10. The image processing device of claim 9 wherein the computing means further comprises:

second storing means for storing at least one additional background level produced by the serial multiplier; and logic control means for controlling the selection of the first storing means and the second storing means in conjunction with the sequencing of the serial multiplier, so as to enable the computation of at least two additional background levels.

11. The image processing device of claim 6 wherein said calculating means includes averaging means for determining an average of the levels of all the non-eliminated video signals.

12. The image processing device of claim 11 wherein said averaging means determines a weighted running average of the signals, with the weighted running average being updated for each video signal received.

13. An apparatus for determining the magnitude of the background in an image represented by a plurality of video signals, wherein said video signals represent both the content and the background regions of the image, including:

windowing means for identifying a selected portion of the video signals in the image;

means, coupled to said windowing means, for identifying those selected video signals which represent the content regions, said identifying means eliminating the content region video signals, thereby leaving video signals representative of the background region; and arithmetic means, coupled to said qualification means, for calculating a background magnitude as a function of the magnitude of the background region video signals.

14. An apparatus for determining the magnitude of the background in an image represented by a plurality of video signals, wherein said video signals represent both the content and the background regions of the image, including:

windowing means for identifying a selected portion of the video signals in the image, wherein said windowing means includes means for storing coordinates, of a window region, and means responsive to the stored window coordinates for generating a window signal associated with the video signal, with the level of the window signal being indicative of whether the video signal is within the window region;

means, coupled to said windowing means, for eliminating the selected video signals which are representative of the content regions, thereby leaving video signals representative of the background region; and arithmetic means, coupled to said qualification means, for calculating a background magnitude as a function of the magnitude of the background region video signals.

15. The apparatus of claim 14 further including means for computing at least one additional background magnitude with the additional background magnitude being a function of the background magnitude.

16. The apparatus of claim 14 wherein the windowing means is programmable, thereby allowing the portion of the video signals in the image which are selected to be included in the determination of the background magnitude to be established by an external data source.

17. The apparatus of claim 14 wherein the arithmetic means includes means for calculating an average of the magnitudes of the non-eliminated video signals.

18. The apparatus of claim 17 wherein said average calculating means determines a weighted running average of the signal magnitudes with the weighted running average being updated for each selected video signal received.

19. The apparatus of claim 14 wherein the eliminating means includes:
memory means for receiving and storing a background threshold value;
means, in communication with said memory means, for comparing the magnitude of the video signal against the stored background threshold value and producing a control signal whenever the magnitude of the video signal is less than the background threshold value, thereby identifying the video signal as a content region video signal; and
means, responsive to the control signal, for bypassing the content region video signal at any time the comparing means produces the control signal.

20. The apparatus of claim 19, further including means for substituting an alternate video signal for each content region video signal bypassed.

21. The apparatus of claim 19 wherein said eliminating means is programmable, thereby allowing an external source to vary the background threshold value used to eliminate the selected video signals which represent content regions of the image.

22. The method of determining the level of the background region of an image represented by a plurality of video signals, during the processing of the video signals, comprising the steps of:
receiving the video signals as a stream of sequential signals;
sampling a selected portion of the video signals received;
eliminating sampled video signals that are non-representative of the level of the background region; and
calculating a background level as a function of the non-eliminated sampled video signals.

23. The method of claim 22, wherein the sampling step comprises the steps of:
identifying the boundaries of a window encompassing the selected portion of the image; and
generating a sample signal indicating when a received video signal is within said window.

24. The method of determining the level of the background region of an image represented by a plurality of video signals, during the processing of the video signals, comprising the steps of:
receiving the video signals as a stream of sequential signals;
sampling a selected portion of the video signals received, said sampling step including,
identifying the boundaries of a window encompassing the selected portion of the image by initializing at least one slow-scan counter with a coordinate value representing a boundary of the window, initializing at least one fast-scan counter with a coordinate value representing a boundary of the window, and using the coordinate values stored in said fast-scan and slow-scan counters to represent the window boundaries, and
generating a sample signal indicating when a received video signal is within said window;
eliminating sampled video signals that are non-representative of the level of the background region; and
calculating a background level as a function of the non-eliminated sampled video signals.

25. The method of claim 24, wherein the generating step comprises the steps of:
selectively incrementing said slow-scan counter whenever a complete raster of video signals has been processed;
selectively incrementing said fast-scan counter whenever a video signal has been processed; and
combining the outputs from the slow-scan counter and the fast-scan counter in a manner so as to produce a signal which is active whenever the video signal being received is within the boundaries of the window.

26. The method of determining the level of the background region of an image represented by a plurality of video signals, during the processing of the video signals, comprising the steps of:
receiving the video signals as a stream of sequential signals;
sampling a selected portion of the video signals received;
eliminating sampled video signals that are non-representative of the level of the background region, said eliminating step including
storing a background threshold value,
comparing the magnitude of the sampled video signal against the stored background threshold value, and
bypassing the sampled video signal at any time the magnitude of the sampled video signal is less than the stored background threshold value;
calculating a background level as a function of the non-eliminated sampled video signals.

27. The method of claim 26, further including the step of substituting an alternate value for the sampled video signals which are bypassed.

28. The method of determining the level of the background region of an image represented by a plurality of video signals, during the processing of the video signals, comprising the steps of:
receiving the video signals as a stream of sequential signals;
sampling a selected portion of the video signals received;
eliminating sampled video signals that are non-representative of the level of the background region; and
calculating a background level as a function of the non-eliminated sampled video signals, including calculating a weighted running average of the magnitudes of the non-eliminated sampled video signals.

29. The method of claim 28, wherein the step of calculating a weighted running average of the magnitudes of the non-eliminated sampled video signals comprises the steps of:

retrieving the magnitude of the non-eliminated sampled video signal;

multiplying the magnitude of the non-eliminated sampled video signal by a first weighting factor to produce a first product;

retrieving a previously stored weighted running average;

multiplying the previously stored weighted running average by a second weighting factor to produce a second product;

adding the first product and the second product to produce a sum which is the new weighted running average; and storing the new weighted running average for subsequent retrieval.

* * * * *